(12) United States Patent
Balakrishnan et al.

(10) Patent No.: US 11,966,460 B2
(45) Date of Patent: Apr. 23, 2024

(54) FACILITATING GENERATION OF CREDENTIALS AND VERIFICATION THEREOF WITHIN A DISTRIBUTED OBJECT STORAGE SYSTEM

(71) Applicant: Dell Products, L.P., Round Rock, TX (US)

(72) Inventors: Ananthakrishnan Balakrishnan, Edison, NJ (US); Peter Musial, Arlington, MA (US); Seema Tahaliyani, Southborough, MA (US); Yuanyuan Zhang, Newark, CA (US); Sandesh Shivaram, Karnataka (IN); Pavel Khlebnikov, Issaquah, WA (US)

(73) Assignee: Dell Products, L.P., Round Rock, TX (US)

( * ) Notice: Subject to any disclaimer, the term of this patent is extended or adjusted under 35 U.S.C. 154(b) by 194 days.

(21) Appl. No.: 17/583,861

(22) Filed: Jan. 25, 2022

(65) Prior Publication Data
US 2023/0237146 A1 Jul. 27, 2023

(51) Int. Cl.
*G06F 21/45* (2013.01)
*H04L 9/08* (2006.01)
*H04L 9/32* (2006.01)

(52) U.S. Cl.
CPC ............ *G06F 21/45* (2013.01); *H04L 9/0861* (2013.01); *H04L 9/0891* (2013.01); *H04L 9/321* (2013.01); *H04L 9/3268* (2013.01)

(58) Field of Classification Search
CPC ....... G06F 21/45; G06F 21/33; H04L 9/0861; H04L 9/0891; H04L 9/321; H04L 9/3268; H04L 9/0894; H04L 9/3228; H04L 9/3247; H04L 9/3263
See application file for complete search history.

(56) References Cited

U.S. PATENT DOCUMENTS

| | | | |
|---|---|---|---|
| 7,721,329 B2* | 5/2010 | Toomey | G06F 21/33 726/9 |
| 2015/0348015 A1* | 12/2015 | Ren | G06Q 20/3229 705/41 |
| 2016/0065370 A1* | 3/2016 | Le Saint | H04L 9/0891 713/155 |
| 2017/0155647 A1* | 6/2017 | Hennebert | H04L 63/08 |
| 2017/0220823 A1* | 8/2017 | Law | H04L 9/0861 |

(Continued)

*Primary Examiner* — J. Brant Murphy
(74) *Attorney, Agent, or Firm* — Amin, Turocy & Watson, LLP

(57) ABSTRACT

Facilitating the generation of ephemeral credentials and verification thereof within a distributed storage system is provided herein. Based on a request for ephemeral credentials from a first account client to a first node of a first storage instance of a distributed system, generating the ephemeral credential comprising a session token and a secret session key for the first account client by a method that derives the secret session key using a first account private key and a first storage instance public key. This session token along with a signature generated using the secret session key of the ephemeral credential is subsequently used to make further requests to a second node of a second storage instance of the distributed system where the secret session key is independently derived using information in the request and the previously shared first account private key to verify the signature in the request.

20 Claims, 11 Drawing Sheets

(56) References Cited

U.S. PATENT DOCUMENTS

| | | | |
|---|---|---|---|
| 2019/0245835 A1* | 8/2019 | Ja | H04L 63/20 |
| 2020/0019708 A1* | 1/2020 | Puthillathe | H04L 63/10 |
| 2020/0136823 A1* | 4/2020 | Montero | H04L 9/3066 |
| 2020/0259805 A1* | 8/2020 | Grobelny | G06F 21/85 |
| 2021/0091951 A1* | 3/2021 | Wilson | H04L 63/0807 |
| 2021/0136047 A1* | 5/2021 | Wilson | H04L 63/0435 |
| 2022/0060900 A1* | 2/2022 | Yoon | H04L 9/0844 |
| 2022/0070001 A1* | 3/2022 | Le Saint | H04L 9/0841 |

* cited by examiner

FACILITATING GENERATION OF CREDENTIALS AND VERIFICATION THEREOF WITHIN A DISTRIBUTED OBJECT STORAGE SYSTEM

BACKGROUND

Distributed storage systems and/or object storage systems can provide a wide range of storage services while achieving high scalability, availability, and serviceability. Operations of storage systems and/or object storage systems can include a file and/or object retrieval system available for credentialed use. In order to retrieve the object, the identification of a source of a request for the object is verified before access to the object is granted.

The above-described context with respect to conventional storage systems is merely intended to provide an overview of current technology and is not intended to be exhaustive. Other contextual description, and corresponding benefits of some of the various non-limiting embodiments described herein, will become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an embodiment, a system includes a processor and a memory that stores executable instructions that, when executed by the processor, facilitate performance of operations. The operations include joining a federation environment that comprises a group of object storage instances that comprise the first object storage instance and at least a second object storage instance. The operations also include installing a certificate authority certificate of the federation environment as a trust anchor. Further, the operations include replicating, at the first object storage instance, a first account of the second object storage instance as a first replicated account, wherein the replicating comprises transferring a public-private key pair between the first object storage instance and the second object storage instance.

According to another embodiment, provided herein is a system that includes a processor and a memory that stores executable instructions that, when executed by the processor, facilitate performance of operations. The operations can include, during a defined time interval, conveying a signed certificate containing a public key associated with a first object storage instance to a second object storage instance, and a signed certificate associated with the second object storage instance to the first object storage instance. The signed certificate comprises the public key from the respective object storage instance key-pairs. Based on an authenticated/authorized request to obtain ephemeral credentials from an object storage instance, the credentials are generated and returned by the system. These ephemeral credentials can be used to access data from any object storage instance.

As discussed herein, after the initial sharing of the secret, the shared secret can be changed without any further sharing of secrets. Further, the new secret (e.g., the changed secret) can be determined from publicly available information. For example, as discussed herein the disclosed embodiments can deterministically generate a SecretSessionKey using information available in the request along with minimally shared secret information.

To the accomplishment of the foregoing and related ends, the disclosed subject matter includes one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Figure 1:
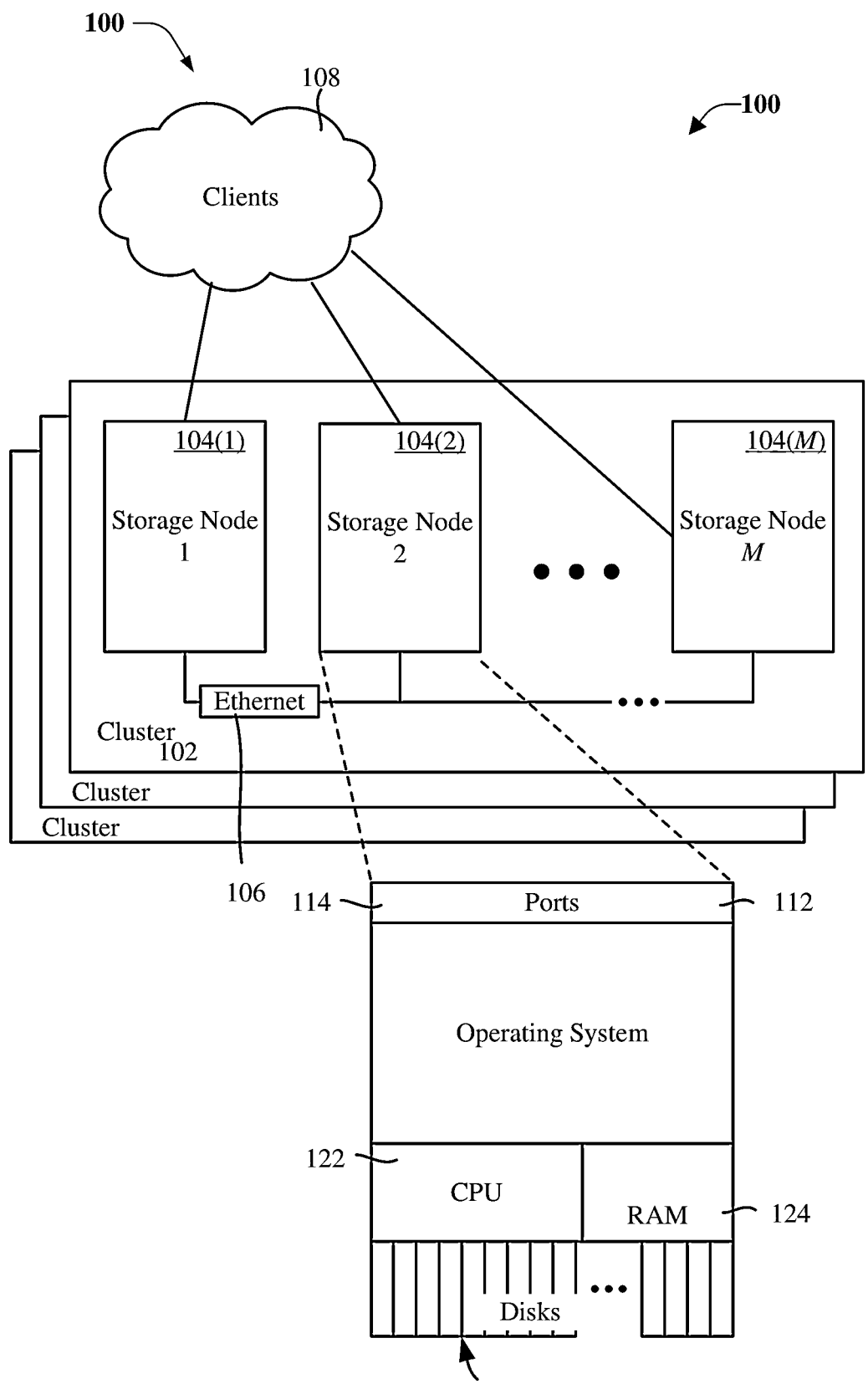
FIG. 1 illustrates an example of one or more clusters in a federation where each cluster includes one or more computing devices, in accordance with one or more embodiments described herein.

FIG. 1 illustrates an example of one or more clusters in a federation where each cluster includes one or more computing devices, in accordance with one or more embodiments described herein. FIG. 1 includes one or more clusters, one of which is labeled as a cluster 102, of data node devices, referred to in FIG. 1 as storage nodes 104(1), 104(2) . . . 104(M), where M is a positive integer. Each storage node 104(1), 104(2) . . . 104(M) can comprise a computing device. Storage nodes 104(1), 104(2) . . . 104(M) can be configured to serve objects in response to requests from clients 108. Furthermore, typically one of the storage nodes 104(1), 104(2) . . . 104(M) can host a cluster controller virtual machine (not shown in FIG. 1), making that node the cluster controller node which administers the cluster 102. The storage nodes 104(1), 104(2) . . . 104(M) can be coupled to one other via a suitable data communications link comprising interfaces and protocols such as, but not limited to, Ethernet block 106.

Clients 108 can send data system-related requests to the cluster 102, which in general can be configured as one large object namespace. The cluster 102 can maintain an unlimited number of objects (e.g., up to trillions of objects or more). To this end, a node such as the node 104(2) generally comprises ports 112 by which clients 108 connect to the cluster 102. Example ports 112 are provided for requests via various protocols, including but not limited to SMB (Server Message Block), FTP (File Transfer Protocol), HTTP/HTTPS (Hypertext Transfer Protocol), and NFS (Network File System); further, SSH (Secure Shell) allows administration-related requests, for example.

Each node, such as the node 104(2), can include an instance of an operating system 114 (e.g., a OneFS®, PowerScale®, or other operating system). One example of a computing platform that can optionally incorporate the techniques disclosed herein is an Objectscale® cluster provided by DELL®, Inc. It can be appreciated that this is one of many optional cluster computing technologies, any of which can incorporate the teachings of this disclosure.

Each node, such as the node 104(2), can furthermore include a CPU 122, RAM 124, and storage devices such as disks 126. RAM 124 and disks 126 can comprise, for example, volatile memory, nonvolatile memory, hard disk drives, solid-state drives or other types of memory devices. Furthermore, RAM 124 and disks 126 at multiple of the storage nodes 104(1)-104(M), as well as other storage devices attached to the cluster 102, can be used to collectively support a logical disk which provides a shared storage location for the cluster 102.

It is noted that cluster deployments can be of any size. Depending on the needs of a particular organization, some clusters can comprise five or fewer nodes, while large clusters can comprise much larger numbers of nodes. The technologies disclosed herein can be included in clusters of any size.

The subject disclosure relates generally to object storage systems. More specifically, the subject disclosure relates to facilitating generation of ephemeral credentials and verification thereof within a distributed object storage system. Further, the disclosed embodiments relate to verifying ephemeral credentials generated from a first object storage instance at other object storage instances. the object storage instances can be object storage instances of an object storage system. In an example, an object storage instance can be a data center, network equipment, a data node device, and so on.

As discussed herein, object storage includes a trusted federation of individual object storage instances. Within an instance, a generation component is used to generate short-lived (e.g., 1-12 hours) ephemeral credentials as part of the request from an account client. The ephemeral credentials generated as discussed herein are further used to generate signatures for other requests for resources (e.g., data and management resources) provided by any object storage instance of the federation.

The disclosed embodiments provide the ability to generate ephemeral credentials in one object storage instance and be able to use the ephemeral credentials to make data or management requests to other object storage instances. Accordingly, the disclosed embodiments can deterministically generate a SecretSessionKey using information available in the request along with minimally shared secret information. The disclosed embodiments can be based on any key agreement protocol (e.g., Diffie-Hellman). Further, the disclosed embodiments can generate and distribute the ephemeral credentials securely and in a scalable manner.

Ephemeral credentials include a SecretSessionKey and a SessionToken. The contents of the SessionToken can be fixed based on the incoming request for ephemeral credentials by an account client. On a single instance of an object storage, according to an embodiment, the SecretSessionKey can be generated by performing a keyed-hash based message authentication code of the SessionToken using the shared secret key per account. However, if other object storage instances are to be able to verify the ephemeral credentials, then other object storage instances need to independently derive the same shared secret key. Provided herein are the generation, use, and verification of ephemeral credentials along with a rotation mechanism to periodically change the secret key of the account. This is performed using only a one-time sharing of account credentials.

Figure 2:
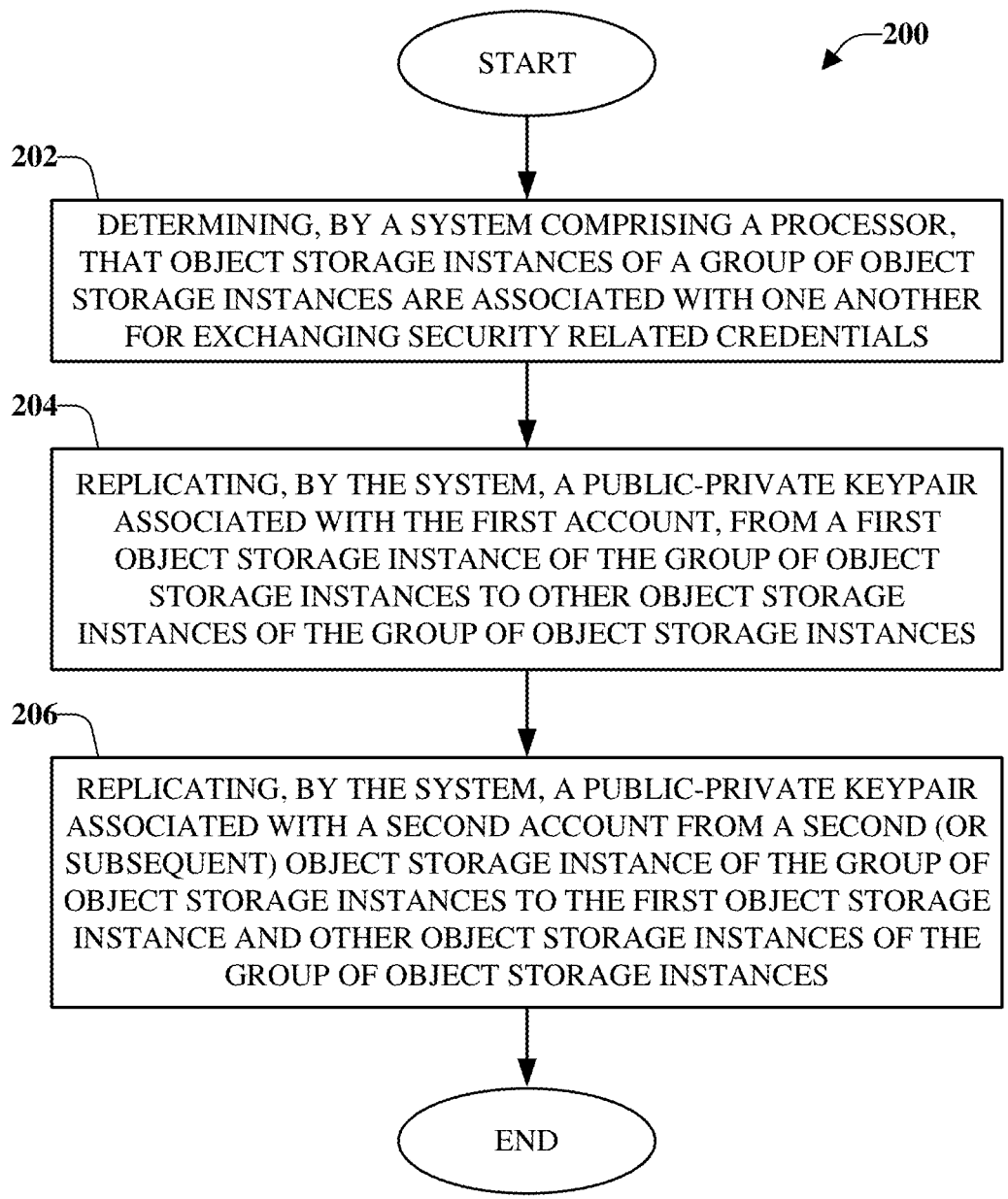
FIG. 2 illustrates a flow diagram of an example, non-limiting, computer-implemented method that facilitates initial trust establishment in accordance with one or more embodiments described herein.

FIG. 2 illustrates a flow diagram of an example, non-limiting, computer-implemented method 200 that facilitates initial trust establishment in accordance with one or more embodiments described herein. The computer-implemented method 200 and/or other methods discussed herein can be implemented by a system comprising a processor and a memory. In an example, the system can be implemented by a node device of a computing system, such as a distributed object storage system.

The computer-implemented method 200 starts at 202, when object storage instances of a group of object storage instances are determined to be associated with one another for the exchange of security related credentials. For example, the determination can be based on the object storage instances being associated via a federated environment of a certification authority. By being associated via the federated environment, the object storage instances receive and install the federation certificate authority certificate as a trust anchor.

At 204, the public-private key pair associated with the first account is replicated from a first object storage instance of the group of object storage instances to other object storage instances of the group of object storage instances. The first account is an account for which the first object storage instance is the owner of the account. In some implementations, the first object storage instance can be an owner for more than one account.

In an example, an application executing on the group of object storage instances, can facilitate the replication. In an example, the application can be a web service. In a specific example, the web service can be, but is not limited to an Identify and Access Management (IAM) web service.

The replication can include a one-time transfer of a public-private key pair per account. According to some implementations, the public-private key pair can be a Diffie-Hellman Public-Private key pair (e.g., account-KeyPair) per account.

Further, the other object storage instances replicate respective account public-private key pair for which the respective object storage instance is the account owner. For example, at 206, a second account credential is replicated from a second object storage instance of the group of object storage instances to the first object storage instance and other object storage instances of the group of object storage instances.

It is noted that the exchange of federation certificates according to 202 is a one-time process. Thus, there is only a one time (e.g., a single time) global exchange of federation related certificates across the group of storage object instances. Thereafter, if a new account is added, only a public-private key pair of that new account is replicated across the object storage instances. There is not another replication of the previously replicated key pairs.

Figure 3:
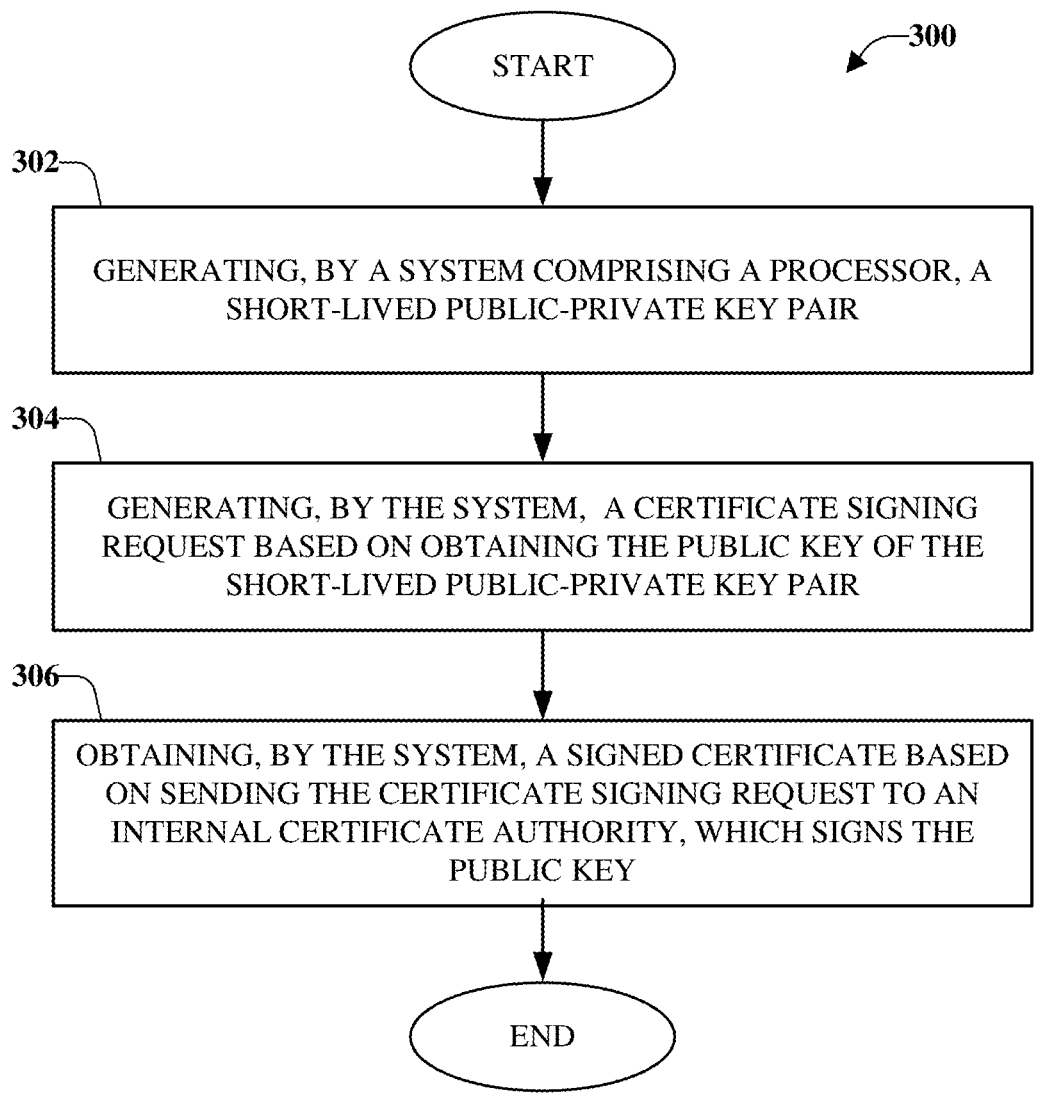
FIG. 3 illustrates a flow diagram of an example, non-limiting, computer-implemented method that facilitates periodic ephemeral credential generation in accordance with one or more embodiments described herein.

FIG. 3 illustrates a flow diagram of an example, non-limiting, computer-implemented method 300 that facilitates periodic ephemeral credential generation in accordance with one or more embodiments described herein. The computer-implemented method 300 and/or other methods discussed herein can be implemented by a system comprising a processor and a memory. In an example, the system can be implemented by a node device of a computing system, such as a distributed object storage system.

The computer-implemented method 300 starts at 302, when a short-lived public-private key pair is generated. The public-private key pair can be a short-lived Diffie-Hellman public-private key pair (e.g., an objectscale-KeyPair). The short-lived public-private keypair can be generated in a secure token service, as discussed herein.

A certificate signing request is generated, at 304, for the public key of the short-lived public-private key pair. Further, at 306, a signed certificate is obtained. For example, the signed certificate (e.g., objectscale-Public-Certificate) can be obtained by sending the certificate signing request to an internal certificate authority, which signs the public key. It is noted that the internal certificate authority certificate (e.g., the signed certificate) is signed by the federation certification authority that is trusted by all object storage instances.

Figure 4:
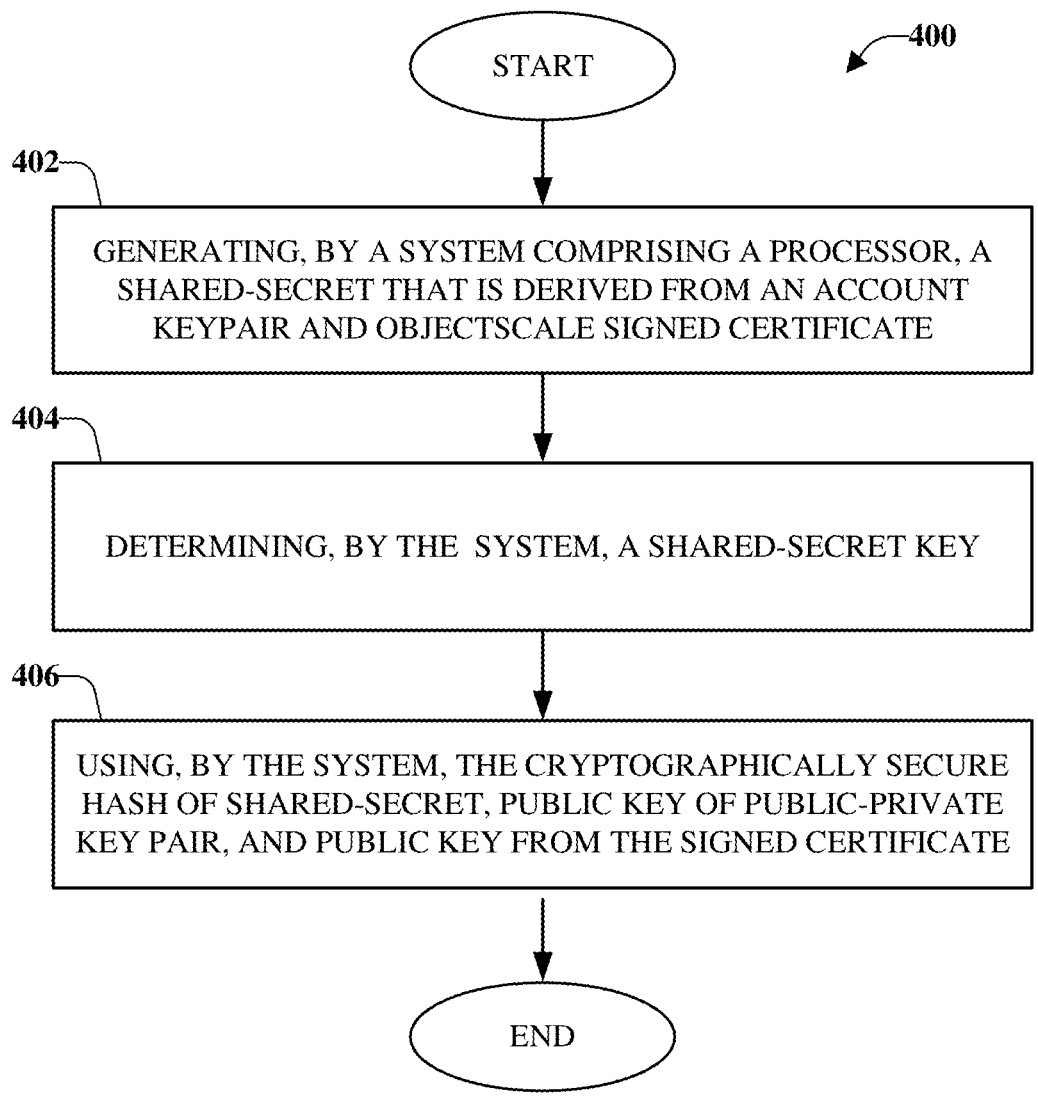
FIG. 4 illustrates a flow diagram of an example, non-limiting, computer-implemented method that facilitates generating a shared-secret-key in accordance with one or more embodiments described herein.

FIG. 4 illustrates a flow diagram of an example, non-limiting, computer-implemented method 400 that facilitates generating a shared-secret-key in accordance with one or more embodiments described herein. The computer-implemented method 400 and/or other methods discussed herein can be implemented by a system comprising a processor and a memory. In an example, the system can be implemented by a node device of a computing system, such as a distributed object storage system.

A shared-secret is generated, at 402 of the computer-implemented method 400. To generate the shared secret, a private key of the public-private key pair (e.g., generated at 204 of FIG. 2) and the public key of the signed certificate (e.g., generated at 306 of FIG. 3) are used. For example, the private key in the account-KeyPair and the public key in the objectscale-Public-Certificate can be used to generate the shared-secret. Thus, shared-secret=Key-Agreement(account-KeyPair.private, objectscale-Public-Certificate.public).

At 404 of the computer-implemented method 400, a shared-secret-key is determined. To determine the shared-secret-key, at 406, the secure cryptographic hash (e.g., SHA-256) of the Shared-secret, the public key of public-private key pair, and the public key from the signed certificate are used, in the order indicated. The public key is the public key of account-Key Pair (from 204 of FIG. 2). The public key of the signed certificate is the objectscale-Public-Certificate. Thus, shared-secret-key=SecureCryptographicHash.update (shared-secret).update(account-KeyPair.public).update (objectscale-Public-Certificate.public).digest( ).

Figure 5:
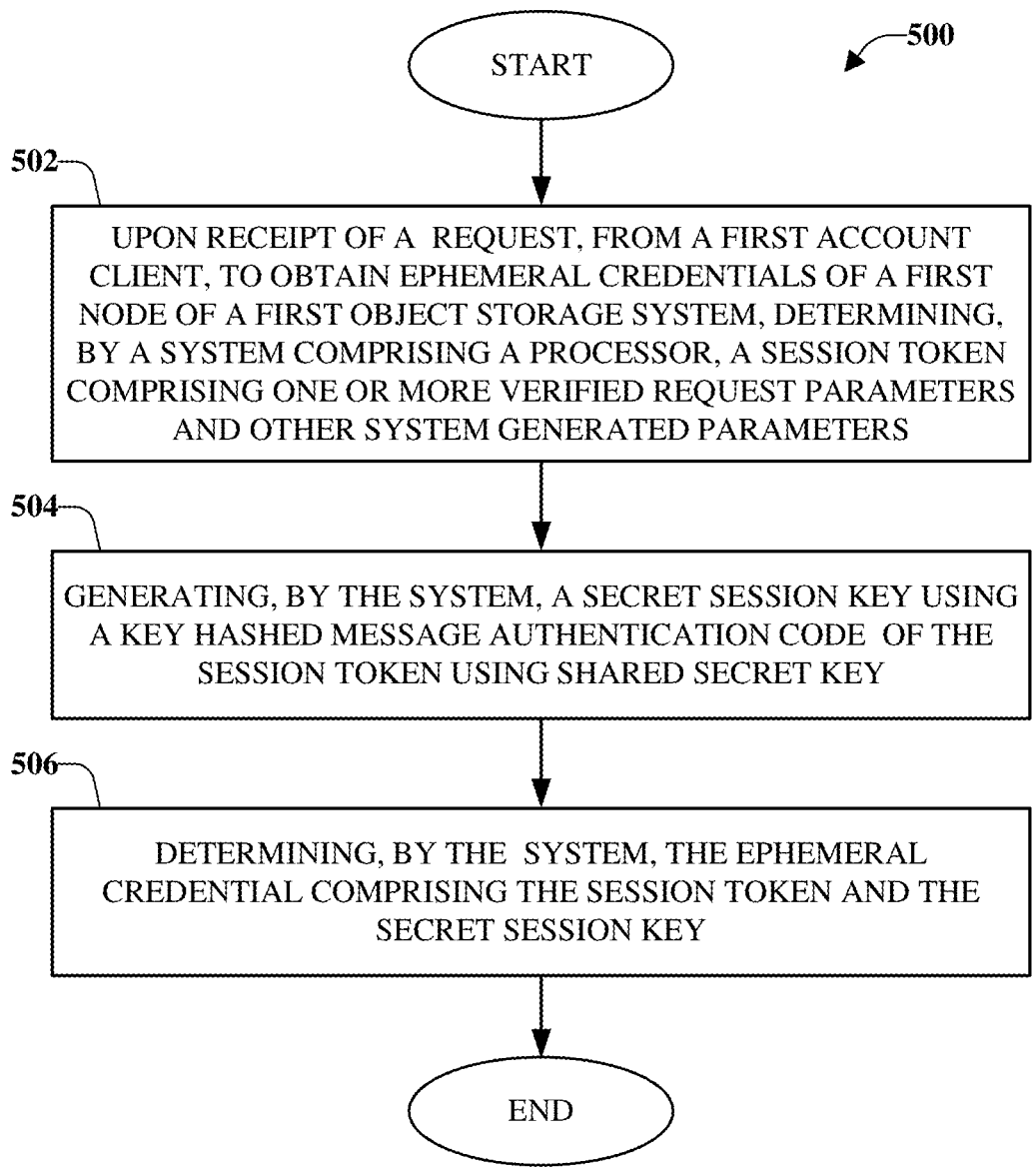
FIG. 5 illustrates a flow diagram of an example, non-limiting, computer-implemented method that facilitates generating account specific ephemeral credentials in accordance with one or more embodiments described herein.

FIG. 5 illustrates a flow diagram of an example, non-limiting, computer-implemented method 500 that facilitates generating account specific ephemeral credentials in accordance with one or more embodiments described herein. The computer-implemented method 500 and/or other methods discussed herein can be implemented by a system comprising a processor and a memory. In an example, the system can be implemented by a node device of a computing system, such as a distributed object storage system.

At 502 of the computer-implemented method 500, a session token is determined after verification of one or more request parameters (req prefix). According to some implementations, after verifying request parameters (req prefix), the session token (SessionToken) can be generated as follows:

RandomNonce=GenerateRandom( )
SessionToken=SessionToken(HmacId, reqAccountId, RandomNonce, expTime, issueTime, reqRoleInfo, reqSessionPolicy, reqProviderInfo)
HmacId=Is the identity of the certificate (e.g., generated at 306 of FIG. 3) available in the common name (CN) field of the local objectscale-Public-Certificate (e.g., urn:osc:objectScaleId:diffie-hellman/uniqueId)

Using the shared-secret-key from 404, a key hashed process is performed on the session token, at 504 of the computer-implemented method 500. For example, the key hashed process can be a keyed-hash based message authentication code (hash-based message authentication code) Shared Hash Algorithm (HMAC-SHA), such as a HMAC-SHA-256. Accordingly:

SecretSessionKey=Keyed-Hashed-MAC(shared-secret-key, SessionToken)

It is noted, in order to assist with verification, the session token (SessionToken) contains the identification of the objectscale-Public-Certificate.

Further, at 506, the ephemeral credential is determined. For example, to determine the ephemeral credential, the computer-implemented method can return the tuple of <SessionToken, SecretSessionKey> as the Ephemeral credential, where:

Ephemeral-credential=<SessionToken, SecretSessionKey>

The ephemeral credentials are intended to be used to make requests for resource access (e.g., Objectscale® data or management endpoints) using any signature algorithm. The purpose of these algorithms is to derive a signing key from the SecretSessionKey and use that to sign a canonical request including the SessionToken and use the resulting signature as part of the request. The SecretSessionKey is never sent as part of the request, as discussed herein.

Figure 6:
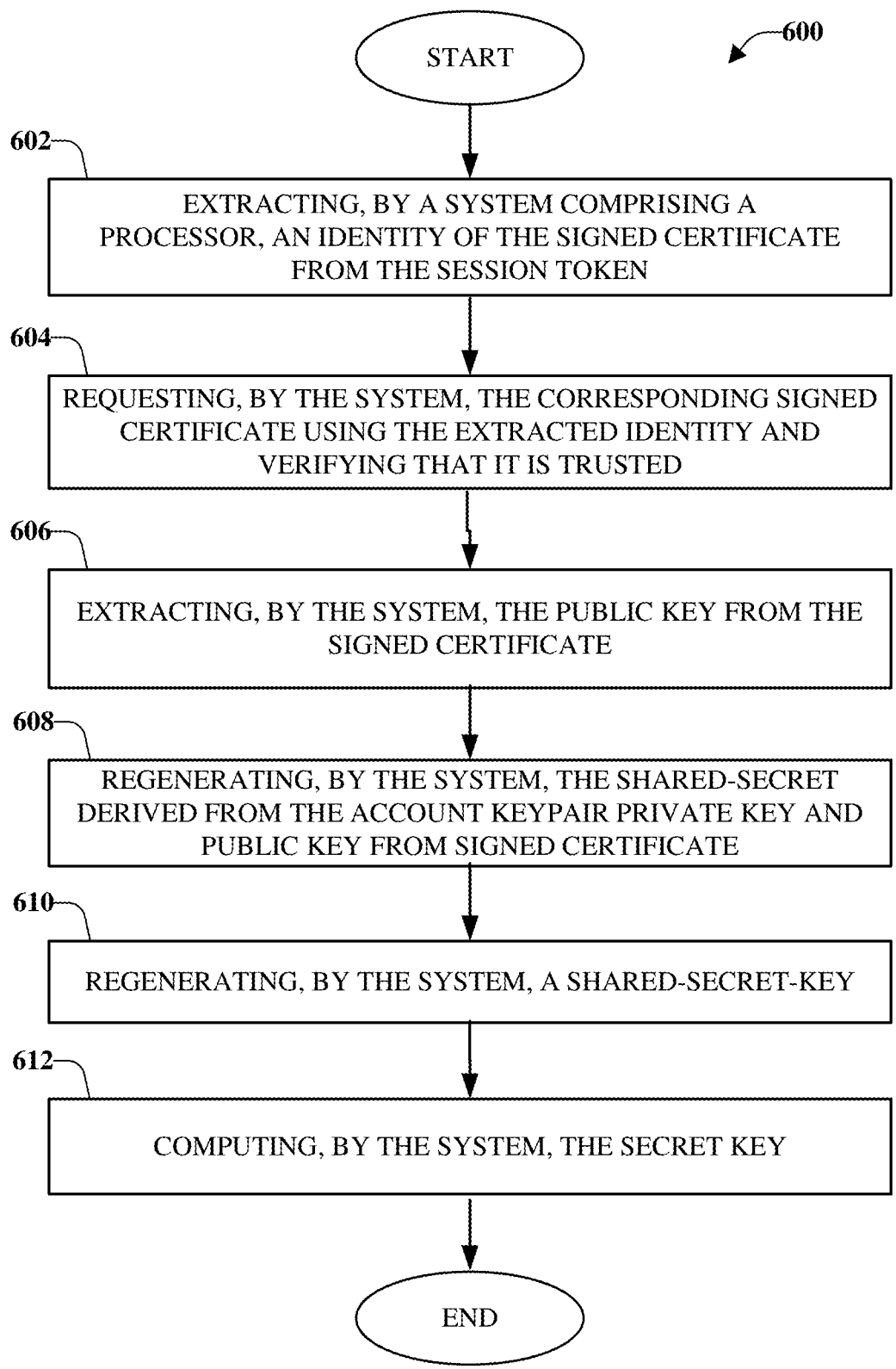
FIG. 6 illustrates a flow diagram of an example, non-limiting, computer-implemented method that facilitates verifying the ephemeral credentials in accordance with one or more embodiments described herein.

FIG. 6 illustrates a flow diagram of an example, non-limiting, computer-implemented method 600 that facilitates verifying the ephemeral credentials in accordance with one or more embodiments described herein. The computer-implemented method 600 and/or other methods discussed herein can be implemented by a system comprising a processor and a memory. In an example, the system can be implemented by a node device of a computing system, such as a distributed object storage system.

Since the SecretSessionKey is not sent as part of the request, the SecretSessionKey is derived from the Session-Token that is received as part of the request. Thus, at 602 of the computer-implemented method 600, the identity of the signed certificate (e.g., the objectscale-Public-Certificate) is extracted from the HmacId field of the session token. Further, at 604, a request for the corresponding signed certificate is made using the identity. It is noted that the signed certificate is issued by a trusted object storage instance. Therefore, the signed certificate can be verified by any other object storage instance of the group of object storage instances in the federation.

The public key is extracted from the verified signed certificate, at 606. The signed certificate can be cached (e.g., in one or more data stores). Accordingly, the signed certificate can be retrieved from cache. Retrieval of the signed certificate outside of cache might not occur often, according to some implementations.

The shared-secret is regenerated, at 608. Regeneration of the shared-secret can be based on using the private key in the account public-private key pair (e.g., account-KeyPair) and the public key in the signed certificate.

At 610, the shared-secret-key corresponding to the ephemeral credential is generated. For example, a SHA-256 of the shared-secret, public key of account-KeyPair, and public key from objectscale-Public-Certificate in that order can be utilized to generate a shared-secret-key. Upon or after the shared-secret-key is generated, at 610, the secret session key is derived. For example, to derive the secret session key, a HMAC-SHA-256 of the session token is performed using the shared-secret key.

Using the derived secret session key (SecretSessionKey), the signature provided as part of the request can be verified. The signature can be verified as specified by the signature verification process.

According to some implementations, the signed certificate (e.g., the objectscale-Public-Certificate) has a limited validity time period, which can be configurable. In an example, the validity of the signed certificate can be two to four weeks after creation. However, other time periods can be utilized (e.g., hours, days, weeks, months, and so on).

When the cluster signed certificate (e.g., the objectscale-Public-Certificate) is created, the signed certificate can be indicated (e.g., flagged, marked, annotated, metadata, and so on), as the active certificate used for generating ephemeral credentials. Thereafter, on a defined time interval (e.g., daily, weekly, and so on), the cluster signed certificate (e.g., the objectscale-Public-Certificate) can be rotated (e.g., renewed) by generating a new cluster signed certificate and marking the new cluster signed certificate as the active certificate used for generating ephemeral credentials.

The prior (or historical) signed certificate can be retained and can be used to validate ephemeral credentials created using the old (or historical) signed certificate. The prior (or historical) signed certificates can be retained in one or more data stores, for example. When the validity of the signed certificate expires, the certificate can be permanently deleted, according to some implementations.

Also, since a certificate (objectscale-Public-Certificate) signed by the internal CA is being used, an authenticated public key is being used.

Figure 7:
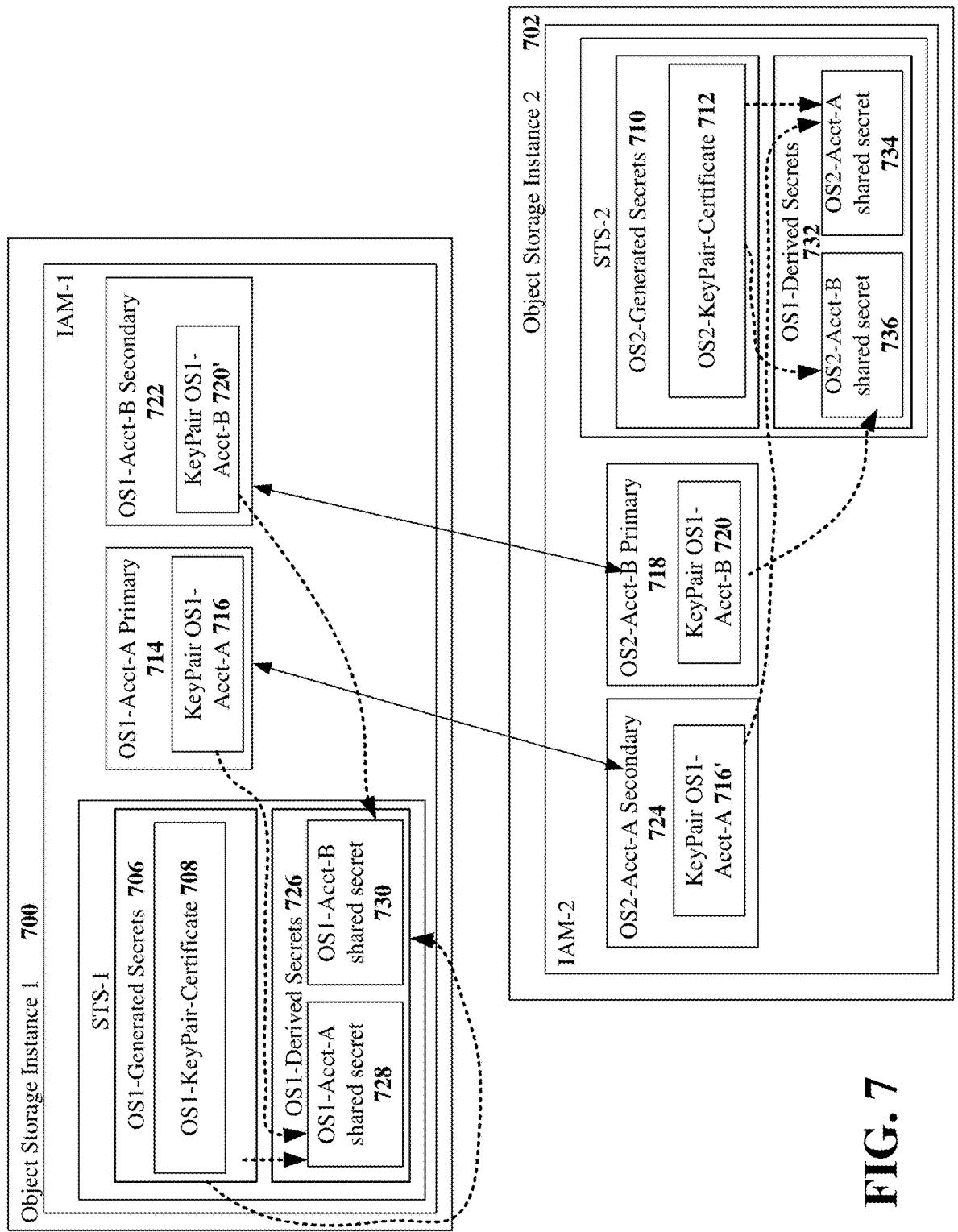
FIG. 7 illustrates schematic representations of a first object storage system instance and a second object storage instance in accordance with one or more embodiments described herein.

FIG. 7 illustrates schematic representations of a first object storage system instance 700 and a second object storage system instance 702. The first object storage system instance 700 and the second object storage system instance 702 include respective Identify and Access Management Applications (IAMs) (e.g., IAM-1 and IAM-2) that include respective Secure Token Services (STS's) (e.g., STS-1 and STS-2).

The respective STS's include respective generated secrets and respective derived secrets. The generated secrets of the first object storage system instance 700 (OS-1 Generated Secrets 706) include a OS1-KeyPair-Certificate 708. The generated secrets of the second object storage system instance 702 (OS-2 Generated Secrets 710) include a OS2-KeyPair-Certificate 712.

The first object storage system instance 700 includes a primary account (OS1-Acct-A Primary 714), which includes a public-private key pair for that account 714 (e.g., KeyPair OS1-Acct-A 716). Further, the second object storage system instance 702 includes a primary account (OS2-Acct-B Primary 718), which includes a public-private key pair for the second account 702 (e.g., KeyPair OS1-Acct-B 720).

Further, the first object storage system instance 700 includes a copy (OS1-Acct-B secondary 722) of the primary account (OS2-Acct-B Primary 718 containing a copy of the public-private key pair of the primary account (e.g., KeyPair OS1-Acct-B 720'), indicated by the arrow. Additionally, the second object storage system instance 702 includes a secondary account (OS1-Acct-A secondary 724), which is a copy of the primary account (OS1-Acct-A Primary 714) containing a copy of the public-private key pair (e.g., KeyPair OS1-Acct-A 716') from the first object storage system instance 700, indicated by the arrow.

The derived secrets (e.g., OS-1 Derived Secrets 726) of the first object storage system instance 700 include a first shared secret (OS1-Acct-A shared secret 728) and a second shared secret (OS1-Acct-B shared secret 730). The first shared secret (OS1-Acct-A shared secret 728) is derived from the OS1-KeyPair-Certificate 708 and the KeyPair OS1-Acct-A 716. The second shared secret (OS1-Acct-B shared secret 730) is derived from the OS1-KeyPair-Certificate 708 and the KeyPair OS1-Acct-B 720'.

The derived secrets (e.g., OS-2 Derived Secrets 732) of the second object storage system instance 702 include a first shared secret (OS2-Acct-A shared secret 734) and a second shared secret (OS2-Acct-B shared secret 736). The first shared secret (OS2-Acct-A shared secret 734) is derived using various types of key agreement protocols, such as Diffie-Hellman, for example, from the OS2-KeyPair-Certificate 712 and the KeyPair OS1-Acct-A 716'. The second shared secret (OS2-Acct-B shared secret 736) is derived (e.g., using various types of key agreement protocols) from the OS2-KeyPair-Certificate 712 and the KeyPair OS1-Acct-B 720.

As discussed herein, after the initial sharing of the secret, the shared secret can be changed as often as needed without any further sharing of secrets. This also provides a way for each Object storage instance to change the shared secret at will and for other nodes to determine the new secret from publicly available information.

Figure 8:
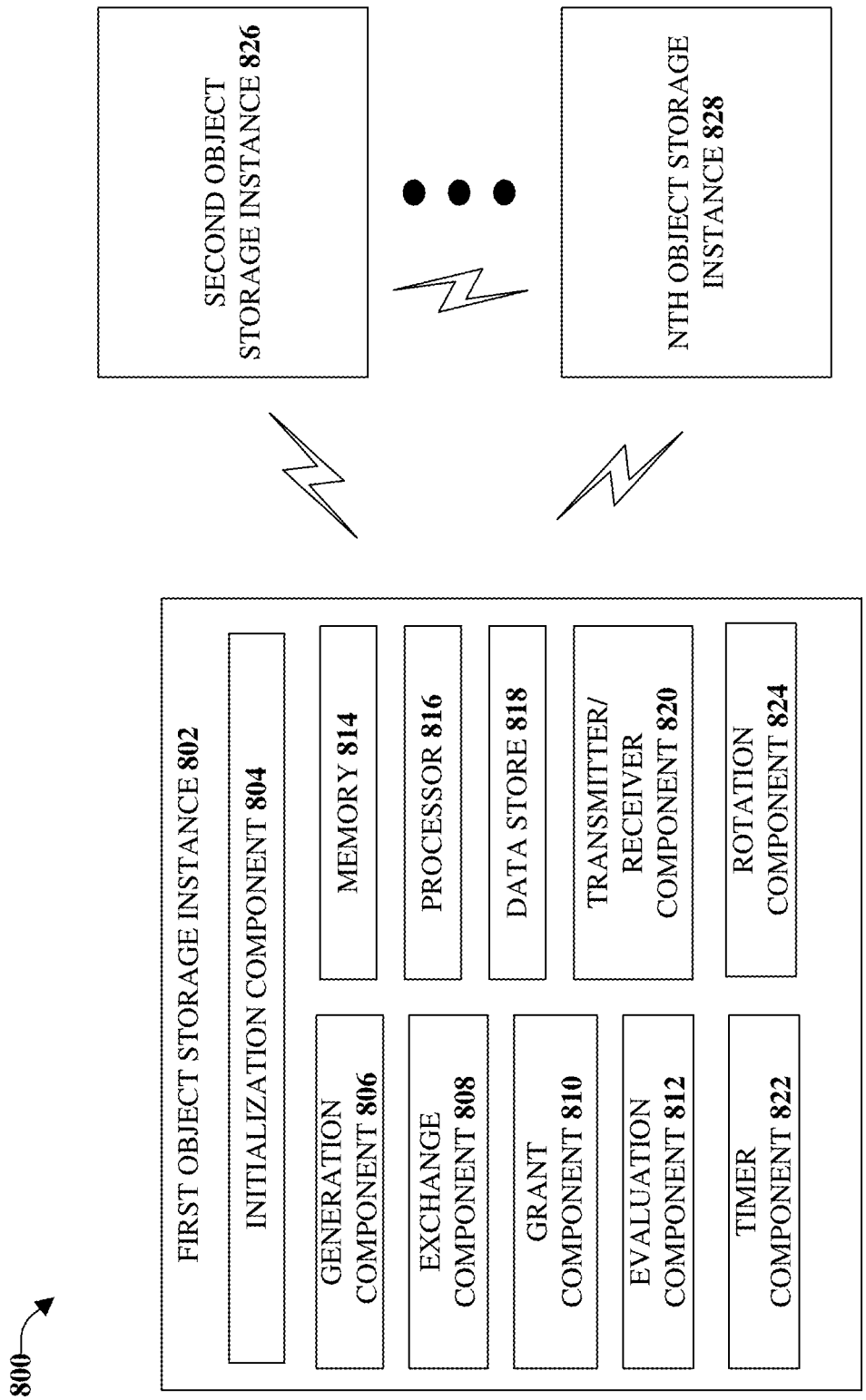
FIG. 8 illustrates an example, non-limiting, system that facilitates initial coordination of information, generation, and verification of ephemeral credentials and rotation of secret keys associated with object storage instances in accordance with one or more embodiments described herein.

FIG. 8 illustrates an example, non-limiting, system that facilitates initial coordination of information, generation, and verification of ephemeral credentials and rotation of secret keys associated with object storage instances in accordance with one or more embodiments described herein. Repetitive description of like elements employed in other embodiments described herein is omitted for sake of brevity. The system 800 can be configured to perform functions associated with the computer-implemented method 200 of FIG. 2, the computer-implemented method 300 of FIG. 3, the computer-implemented method 400 of FIG. 4, the computer-implemented method 500 of FIG. 5, the computer-implemented method 600 of FIG. 6, the first object storage system instance 700, the second object storage system instance 702, other object storage system instances, and/or other computer-implemented methods discussed herein. It is noted that the first object storage instance 802 and the second object storage instance 826 (as well as other storage instances) can comprise similar components and/or functionality.

Aspects of systems (e.g., the system 800 and the like), devices, apparatuses, and/or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 800 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 800 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

The system 800 can include a first object storage instance 802 that includes an initialization component 804, a generation component 806, an exchange component 808, a grant component 810, an evaluation component 812, at least one memory 814, at least one processor 816, at least one data store 818, a transmitter/receiver component 820, a timer component 822, and a rotation component 824.

The initialization component 804 creates the account public-private key pair during account creation (e.g., KeyPair OS1-Acct-A 716) which will be associated only with that account. The initialization component 804 also creates a public-private key pair for the object storage instance and obtains the associated signed certificate from a certification authority for that public key (e.g., OS1-KeyPair-Certificate 708). The other object storage instances include a second object storage instance 826 through an Nth object storage instance 828, where N is an integer. It is noted that the second object storage instance 826 through the Nth object storage instance 828 comprise similar components and/or functionality as the first object storage instance 802 and such functionality components and/or will not be repeated for purposes of simplicity.

Further, the certificate is signed by a certificate authority. For example, the first object storage instance 802, and the second object storage instance 826 through the Nth object storage instance 828 can be part of a federation environment as discussed herein.

The generation component 806 processes requests for generating ephemeral or ephemeral credentials for an account. A shared secret key is generated for that account as shown in FIG. 4. Using this shared secret key and session token containing required request and system parameters (including expiry time), the ephemeral credentials are generated as shown in FIG. 5.

As mentioned, the credential is an ephemeral credential, which can be valid for a duration of the defined period. In some implementations, the defined period is configurable between some administratively pre-defined minimum and maximum values.

The exchange component 808 can coordinate sharing of information with the second object storage instance 826 through the Nth object storage instance 828 (e.g., via the transmitter/receiver component 820). For example, the coordination can include facilitating a one-time transmission of each accounts public-private key pair (e.g., KeyPair OS1-Acct-A 716) to other object storage instances (e.g., the second object storage instance 826 through the Nth object storage instance 828). During the coordination, the other object storage instances send their respective accounts public-private key pairs, created at the other object storage instances to one another and to the first object storage instance 802. Further, upon request, it can facilitate exchange of the object storage instances signed public certificate (created as shown in 300) from one object storage instance to another. For e.g., upon request from second object storage instance 826 through Nth object storage instance 828, to the first object storage instance 802, the exchange component 808 will provide the first object storage instance's signed certificate (e.g., OS1-KeyPair-Certificate 708) to them.

Upon or after the one-time exchange of each accounts public-private key pairs, the object storage instance signed public certificate may change (e.g., OS1-KeyPair-Certificate 708). As discussed above, upon request, these signed public certificates can be exchanged with other object storage instances to be used to verify generated ephemeral credentials. It is noted that after the initial exchange of account private-public key pairs, only the signed public certificates are exchanged to help with verification of ephemeral credentials. Thus, the transmitter/receiver component 820 can receive a request for access to information stored at the first object storage instance 802 using an ephemeral credential. The grant component 810 can selectively grant access to the information upon or after verification of the ephemeral credentials associated with the request. If the credentials are not verified, access to the information is denied. However, if the credentials are verified, access to the information is approved.

The evaluation component 812 can determine that an ephemeral credential, received with the request, is valid as described with respect to FIG. 6. For example, the identity of the signed certificate is extracted from the session token of the ephemeral credential (602) and used to retrieve the signed certificate from the associated object storage instance (604). The shared secret (608) is then regenerated from the private key of the corresponding account public-private key pair and the public key from the retrieved certificate (606). This shared secret is used to derive the shared secret key (610) from which the secret session key (612) is obtained, which will be used to verify the ephemeral credentials. It is noted that after the initial sharing of the account secret (public-private key pair), the shared secret can be changed and determined without any further sharing of secrets, by changing the object storage instance signed public certificate only.

The first object storage instance 802 also includes at least one timer (e.g., the timer component 822) that can be initiated at about the same time as the first object storage instance public-private key pair is created and after subsequent object storage instance public-private key pairs are created. The timer component 822 can be associated with a defined period of time. Upon or after expiration of the defined period of time, the rotation component 824 can rotate (or change) the first object storage instance public-private key pair, resulting in a second object storage instance public-private key pair that comprises a second public key and a second private key. Further, after expiration of respective timers associated with subsequent object storage instance public-private key pairs, the rotation component 824 can rotate (or change) the subsequent object storage instance public-private key pairs in a similar manner. The second public key is associated with a certificate signed by a trusted certification authority.

The at least one memory 814 can be operatively connected to the at least one processor 816. The at least one memory 814 can store executable instructions and/or computer executable components (e.g., the generation component 806, the exchange component 808, the grant component 810, the evaluation component 812, the transmitter/receiver component 820, and so on) that, when executed by the at least one processor 816 can facilitate performance of operations (e.g., the operations discussed with respect to the various methods and/or systems discussed herein). Further, the at least one processor 816 can be utilized to execute computer executable components (e.g., the generation component 806, the exchange component 808, the grant component 810, the evaluation component 812, the transmitter/receiver component 820, and so on) stored in the at least one memory 814.

For example, the at least one memory 814 can store protocols associated with facilitating verification of ephemeral credentials generated from a first node of a distributed object storage system at other nodes of the distributed object storage system as discussed herein. Further, the at least one memory 814 can facilitate action to control communication between the system 800 and other node devices, one or more file/object storage systems, one or more devices, such that the system 800 employs stored protocols and/or algorithms to achieve improved overall performance of file/object systems as described herein.

It should be appreciated that data stores (e.g., memories) components described herein can be either volatile memory or nonvolatile memory or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 816 can facilitate respective analysis of information related to implementing generation/verification of ephemeral credentials generated from a first node of a distributed object storage system at other nodes of the distributed object storage system. The at least one processor 816 can be a processor dedicated to analyzing and/or generating information received, a processor that controls one or more components of the system 800, and/or a processor that both analyzes and generates information received and controls one or more components of the system 800.

The transmitter/receiver component 820 can receive one or more requests to access resources and/or objects and/or can return information indicative of verification of ephemeral credentials generated at other nodes of the distributed object storage system. The transmitter/receiver component 820 can be configured to transmit to, and/or receive data from, for example, one or more other nodes, and/or other communication devices. Through the transmitter/receiver component 820, the system 800 can concurrently transmit and receive data, can transmit and receive data at different times, or combinations thereof.

Figure 9:
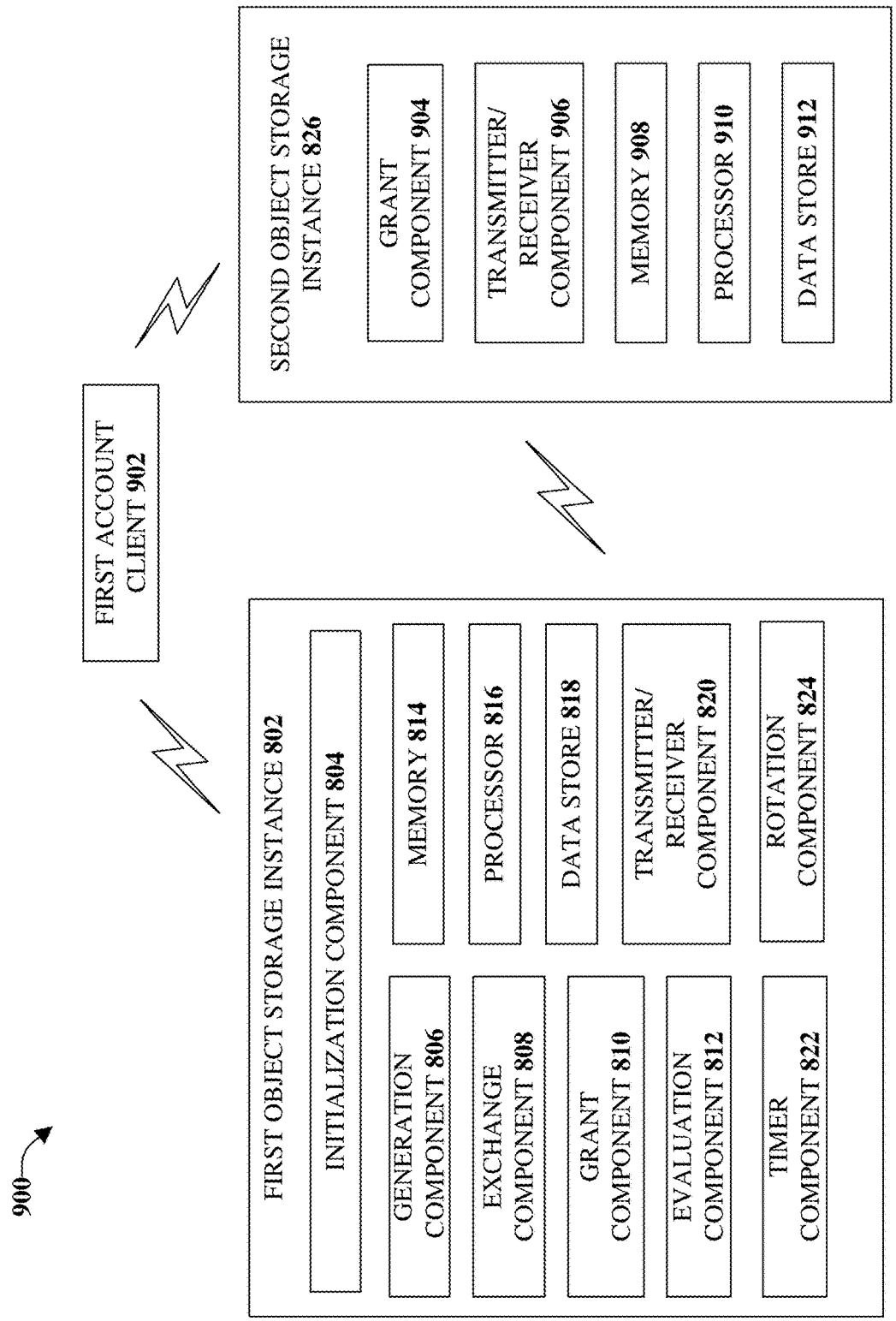
FIG. 9 illustrates an example, non-limiting, system for explanation of the interactions of a first account client in creation, exchange, and verification of ephemeral credentials generated at different object storage instances in accordance with one or more embodiments described herein.

FIG. 9 illustrates an example, non-limiting, system for explanation of the interactions of a first account client in creation, exchange, and verification of ephemeral credentials generated at different object storage instances in accordance with one or more embodiments described herein. Repetitive description of like elements employed in other embodiments described herein is omitted for sake of brevity. The system 900 can be configured to perform functions associated with the computer-implemented method 200 of FIG. 2, the computer-implemented method 300 of FIG. 3, the computer-implemented method 400 of FIG. 4, the computer-implemented method 500 of FIG. 5, the computer-implemented method 600 of FIG. 6, the first object storage system instance 700, the second object storage system instance 702, other object storage system instances, and/or other computer-implemented methods discussed herein. It is noted that the first object storage instance 802 and the second object storage instance 826 (as well as other storage instances) can comprise similar components and/or functionality.

Based on a request for ephemeral credentials from one or more account clients (one of which is illustrated as a first account client 902), the generation component 806 is configured to create an ephemeral credential for the first account client. To generate the ephemeral credentials, the generation component can generate a shared secret for the first account client using a first private key of a first account credential and a first object storage public key obtained from a corresponding signed certificate. The generation component 806 can also derive a shared secret key using the shared secret, a public key of the first account credential, and the first object storage public key. Further, the generation component 806 can generate the ephemeral credential. The ephemeral credential comprises a session token and a secret session key. The session token comprises at least an identity of a first object storage instance certificate, an identity of the first account, a random nonce and expiration time. The secret session key is obtained by performing keyed-hash based message authentication code of the contents of the session token using the shared secret key.

In order for the generation component 806 to create the ephemeral credential, the initialization component 804 can create the first account credential for the first account. The first account credential comprises a first public-private key pair that comprises a first public key and the first private key.

Further, the initialization component 804 can create a first object storage instance public-private key pair. The first object storage instance public-private key pair comprises an object storage instance public key and an object storage instance private key. The object storage instance public key is associated with a certificate signed by a trusted certification authority.

The exchange component 808 can coordinate a one-time sharing of information with the second object storage instance 826. To coordinate the one-time sharing of information, the transmitter/receiver component 820 can facilitate a transmission of the first account credential to the second object storage instance 826. Further, the transmitter/receiver component 820 can receive, from the second object storage instance 826, a second account credential for a second account. The second account credential comprises a second public key and a second private key. Upon or after the one-time sharing of information, the generation component 806 can generate the ephemeral credential.

The first object storage instance 802 also includes at least one timer (e.g., the timer component 822) that can be initiated at about the same time as the first object storage instance public-private key pair is created and after subsequent object storage instance public-private key pairs are created. The at least one timer can be associated with a defined period of time. Upon or after expiration of the defined period of time, the rotation component 824 can rotate (or change) the first object storage instance public-private key pair, resulting in a second object storage instance public-private key pair that comprises a second public key and a second private key. The second public key is associated with a certificate signed by a trusted certification authority. Further, after expiration of respective timers associated with subsequent object storage instance public-private key pairs, the rotation component 824 can rotate (or change) the subsequent object storage instance public-private key pairs in a similar manner.

According to some implementations, the second object storage instance 826 (and other object storage instances will contain similar components as described with respect the first object storage instance 802) comprises a grant component 904, a transmitter/receiver component 906, at least one memory 908, at least one processor 910, at least one data store 912, and/or other components. The transmitter/receiver component 906 can be configured to exchange credentials with the first object storage instance 802 (and other object storage instances), as discussed above.

Further, the transmitter/receiver component 906 can receive a second request for access to information or a resource stored at the second object storage instance 826 (e.g., in the data store 912). The second request comprises request parameters and a corresponding signature. The request parameters comprise at least a location of the resource, a date, and a time of the request, and the session token of the ephemeral credential generated at the first node of the first object storage instance. The corresponding signature is generated by cryptographically signing the request parameters including the session token using the secret session key of the ephemeral credential.

The grant component 904 can grant (or allow) the request for access to information. To grant the request, the grant component 904 can extract an identity of the corresponding signed certificate from the session token in the second request and use the identity to retrieve the corresponding signed certificate from the first object storage instance, resulting in a retrieved certificate, and validate that the corresponding signed certificate is signed by a trusted authority. Further, the grant component 904 can regenerate the shared secret by extracting the identity of the first account from the session token in the second request and by using the identity to obtain a previous private key of a previously received first account public-private key pair and the public key from the retrieved certificate. Additionally, the grant component 904 can derive the shared secret key by cryptographically hashing the shared secret, a previously received public key of the first account credential, and the public key from the retrieved certificate. Further, the grant component 904 can use the shared secret key and the session token from the request to regenerate the secret session key of the ephemeral credential. The secret session key is used to verify the corresponding signature in the second request.

Methods that can be implemented in accordance with the disclosed subject matter, will be better appreciated with reference to the flow charts provided herein. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

As used herein, the term "storage device," "first storage device," "second storage device," "storage cluster nodes," "storage system," and the like (e.g., node device), can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within an object storage system, which are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

Further, a storage cluster can include one or more storage devices. For example, a storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

Figure 10:
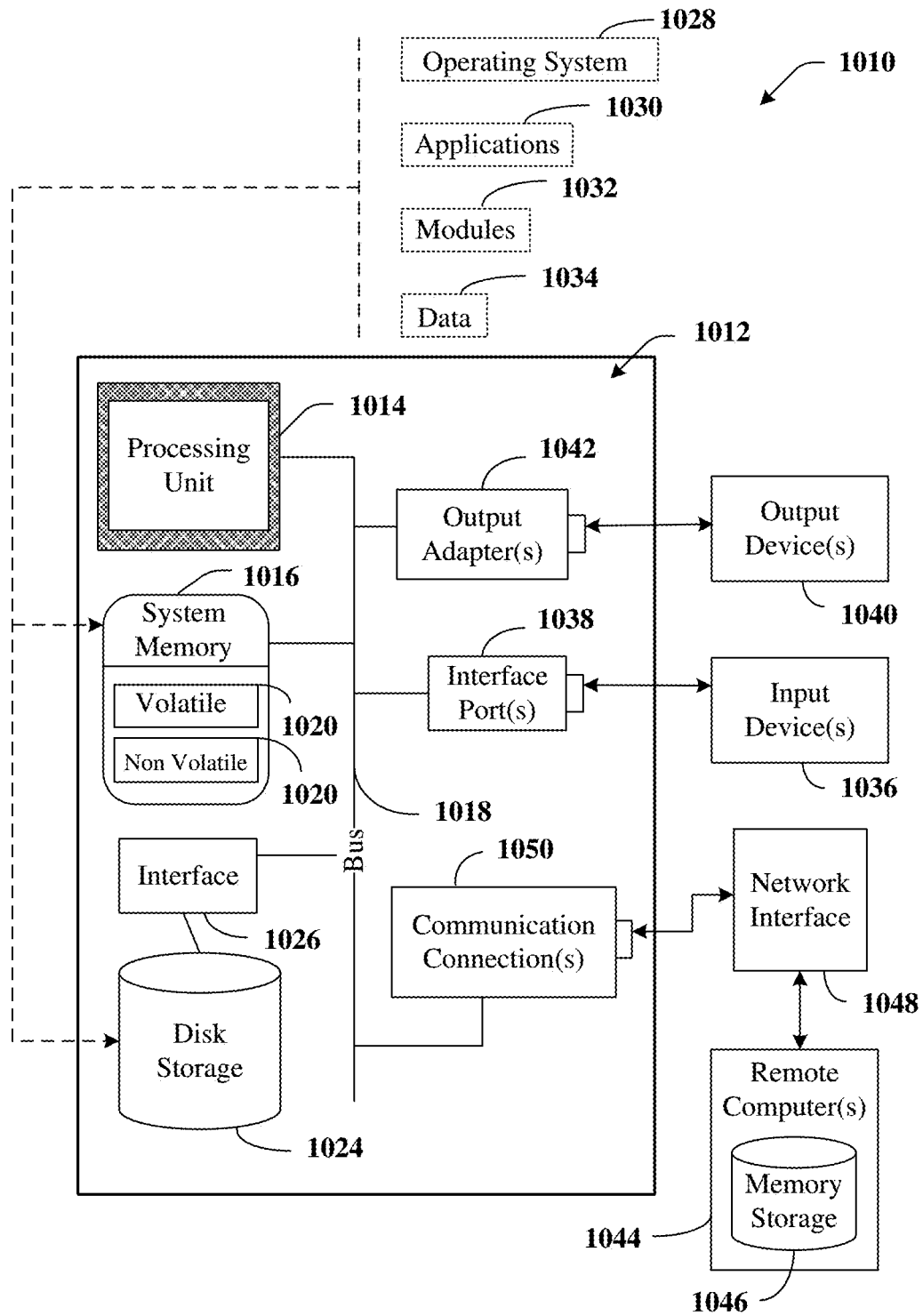
FIG. 10 illustrates an example, non-limiting, computing environment in which one or more embodiments described herein can be facilitated.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5, and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

Figure 11:
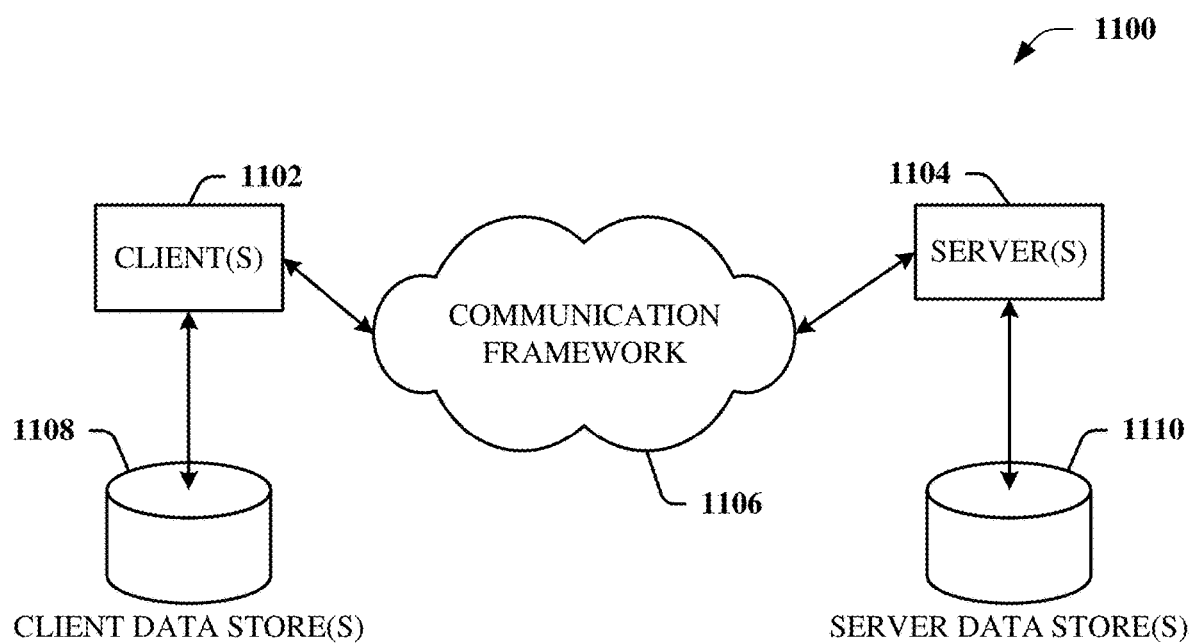
FIG. 11 illustrates an example, non-limiting, networking environment in which one or more embodiments described herein can be facilitated.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. Yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
a first object storage instance comprising a first group of nodes, wherein the first group of nodes comprise at least a first node, and wherein the first node comprises a first processor and a first memory that stores first executable instructions that, when executed by the first processor, facilitate performance of first operations, comprising:
based on a request for ephemeral credentials from a first account client, generating an ephemeral credential for the first account client, wherein the generating comprises:
generating a shared secret for the first account client using a first private key of a first account credential of a first account and a first object storage public key obtained from a corresponding signed certificate,
deriving a shared secret key using the shared secret, a first public key of the first account credential, and the first object storage public key, and
generating the ephemeral credential, wherein the ephemeral credential comprises a session token and a secret session key, wherein the session token comprises at least an identity of a first object storage instance certificate, an identity of the first account, a random nonce and expiration time, and wherein the secret session key is obtained by using the shared secret key to obtain a keyed-hash based message authentication code of contents of the session token.

2. The system of claim 1, wherein, prior to the generating the shared secret, the first operations further comprise:
creating the first account credential for the first account, wherein the first account credential comprises a first public-private key pair that comprises the first public key and the first private key;
creating a first object storage instance public-private key pair, wherein the first object storage instance public-private key pair comprises an object storage instance public key and an object storage instance private key; and
coordinating a one-time sharing of information with a second node of a second object storage instance of the system.

3. The system of claim 2, wherein the coordinating the one-time sharing of information comprises:
facilitating a transmission of the first account credential to the second node; and
receiving, from the second node, a second account credential for a second account, wherein the second account credential comprises a second public key and a second private key.

4. The system of claim 2, wherein the object storage instance public key is associated with a certificate signed by a trusted certification authority.

5. The system of claim 2, wherein the first operations further comprise:
based on expiration of a defined period, rotating the first object storage instance public-private key pair, resulting in a second object storage instance public-private key pair that comprises a second public key and a second private key, wherein the second public key is associated with a certificate signed by a trusted certification authority.

6. The system of claim 1, wherein the request is a first request, wherein the system further comprises a second object storage instance comprising a second group of nodes, wherein the second group of nodes comprise at least a second node, and wherein the second node comprises a second processor and a second memory that stores second executable instructions that, when executed by the second processor, facilitate performance of second operations, comprising:
receiving a second request for access to information or a resource stored at the second node, wherein the second request comprises request parameters and a corresponding signature, wherein the request parameters comprise at least a location of the resource, a date, and a time of the request, and the session token of the ephemeral credential generated at the first node of the first object storage instance, wherein the corresponding signature is generated by cryptographically signing the request parameters including the session token using the secret session key of the ephemeral credential; and
granting the request for access to information or resource.

7. The system of claim 6, wherein the granting comprises:
extracting an identity of the corresponding signed certificate from the session token in the second request and using the identity to retrieve the corresponding signed certificate from the first object storage instance, resulting in a retrieved certificate, and validating that the corresponding signed certificate is signed by a trusted authority;

regenerating the shared secret by extracting the identity of the first account from the session token in the second request and using the identity to obtain a previous private key of a previously received first account public-private key pair and the public key from the retrieved certificate;

deriving the shared secret key by cryptographically hashing the shared secret, a previously received public key of the first account credential, and the public key from the retrieved certificate; and using the shared secret key and the session token from the request to regenerate the secret session key of the ephemeral credential, wherein the secret session key is used to verify the corresponding signature in the second request.

8. The system of claim 1, wherein the system is a distributed system that utilizes ephemeral credentials.

9. The system of claim 1, wherein the system is a distributed object storage system.

10. A method, comprising:

based on a request for ephemeral credentials from a first account client, generating, by a first node that comprises a first processor, an ephemeral credential for the first account client, wherein the first node is included in a group of first nodes of a first object storage instance of a group of object storage instances, and wherein the generating comprises:

generating a shared secret for the first account client using a first private key of a first account credential of a first account and a first object storage public key obtained from a corresponding signed certificate, deriving a shared secret key using the shared secret, a first public key of the first account credential, and the first object storage public key, and generating the ephemeral credential, wherein the ephemeral credential comprises a session token and a secret session key, wherein the session token comprises at least an identity of a first object storage instance certificate, an identity of the first account, a random nonce and expiration time, and wherein the secret session key is obtained by using the shared secret key to obtain a keyed-hash based message authentication code of contents of the session token.

11. The method of claim 10, prior to the generating the shared secret, the method further comprises:

creating, by the first node, the first account credential for the first account, wherein the first account credential comprises the first public-private key pair that comprises a first public key and the first private key;

creating, by the first node, a first object storage instance public-private key pair, wherein the first object storage instance public-private key pair comprises an object storage instance public key and an object storage instance private key; and coordinating, by the first node, a one-time sharing of information with a second node of a second object storage instance.

12. The method of claim 11, wherein the coordinating the one-time sharing of information comprises:

facilitating, by the first node, a transmission of the first account credential to the second node; and receiving, by the first node and from the second node, a second account credential for a second account, wherein the second account credential comprises a second public key and a second private key.

13. The method of claim 11, wherein the object storage instance public key is associated with a certificate signed by a trusted certification authority.

14. The method of claim 11, wherein the method further comprises:

based on expiration of a defined period, rotating, by the first node, the first object storage instance public-private key pair, resulting in a second object storage instance public-private key pair that comprises a second public key and a second private key, wherein the second public key is associated with a certificate signed by a trusted certification authority.

15. The method of claim 10, wherein the request is a first request, and wherein the method further comprises:

receiving, by a second node comprising a second processor, a second request for access to information or a resource stored at the second node, wherein the second node is included in a second group of nodes of a second object storage instance, wherein the second request comprises request parameters and a corresponding signature, wherein the request parameters comprise at least a location of the resource, a date, and a time of the request, and the session token of the ephemeral credential generated at the first node of the first object storage instance, wherein the corresponding signature is generated by cryptographically signing the request parameters including the session token using the secret session key of the ephemeral credential; and granting, by the second node, the request for access to information or resource.

16. The method of claim 15, wherein the granting comprises:

extracting an identity of the corresponding signed certificate from the session token in the second request and using the identity to retrieve the corresponding signed certificate from the first object storage instance, resulting in a retrieved certificate, and validating that the corresponding signed certificate is signed by a trusted authority;

regenerating the shared secret by extracting the identity of the first account from the session token in the second request and using the identity to obtain a previous private key of a previously received first account public-private key pair and the public key from the retrieved certificate;

deriving the shared secret key using the shared secret, a previously received public key of the first account credential, and the public key from the retrieved certificate; and using the shared secret key and the session token from the request to regenerate the secret session key of the ephemeral credential, wherein the secret session key is used to verify the corresponding signature in the second request.

17. A non-transitory machine-readable medium, comprising executable instructions that, when executed by a processor of a first node of a first group of nodes of a first object storage instance, facilitate performance of operations, comprising:

based on a request for ephemeral credentials from a first account client, generating an ephemeral credential for the first account client, wherein the generating comprises:

generating a shared secret for the first account client using a first private key of a first account credential and a first object storage public key obtained from a corresponding signed certificate, deriving a shared secret key using the shared secret, a first public key of the first account credential, and the first object storage public key, and generating the ephemeral credential, wherein the ephemeral credential comprises a session token and a secret session key, wherein the session token comprises at least an identity of a first object storage instance certificate, an identity of a first account, a random nonce and expiration time, and wherein the secret session key is obtained using the shared secret key to obtain a keyed-hash based message authentication code of contents of the session token.

18. The non-transitory machine-readable medium of claim 17, wherein, prior to the generating the shared secret, the operations further comprise:

creating the first account credential for the first account, wherein the first account credential comprises a first public-private key pair that comprises the first public key and the first private key;

creating a first object storage instance public-private key pair, wherein the first object storage instance public-private key pair comprises an object storage instance public key and an object storage instance private key; and coordinating a one-time sharing of information with a second node of a second object storage instance.

19. The non-transitory machine-readable medium of claim 18, wherein the coordinating the one-time sharing of information comprises:

facilitating a transmission of the first account credential to the second node; and receiving, from the second node, a second account credential for a second account, wherein the second account credential comprises a second public key and a second private key.

20. The non-transitory machine-readable medium of claim 18, wherein the object storage instance public key is associated with a certificate signed by a trusted certification authority.

* * * * *